United States Patent
Gater et al.

(10) Patent No.: US 8,342,897 B2
(45) Date of Patent: Jan. 1, 2013

(54) PEDAL PROPULSION SYSTEM

(76) Inventors: David R. Gater, Holland Landing (CA); Thomas N. Banks, Holland Landing (CA)

( * ) Notice: Subject to any disclaimer, the term of this patent is extended or adjusted under 35 U.S.C. 154(b) by 259 days.

(21) Appl. No.: 12/655,298

(22) Filed: Dec. 29, 2009

(65) Prior Publication Data

US 2011/0159751 A1 Jun. 30, 2011

(51) Int. Cl.
*B63H 16/20* (2006.01)
(52) U.S. Cl. ............................................. 440/28; 440/27
(58) Field of Classification Search ..................... 440/21, 440/26, 27, 28, 29, 30, 31
See application file for complete search history.

(56) References Cited

U.S. PATENT DOCUMENTS

| 1,695,304 | A | * | 12/1928 | Turner | 440/30 |
| 5,362,264 | A | * | 11/1994 | Parant | 440/29 |
| 6,171,157 | B1 | * | 1/2001 | Knapp | 440/25 |
| 7,530,867 | B2 | * | 5/2009 | Jackson | 440/30 |
| 7,549,902 | B2 | * | 6/2009 | Jansen | 440/30 |

* cited by examiner

*Primary Examiner* — Lars A Olson
*Assistant Examiner* — Anthony Wiest
(74) *Attorney, Agent, or Firm* — David W. Wong

(57) ABSTRACT

A pedal propulsion system for a transportation conveyance comprises a pedal drive assembly having a teethed synchronous drive belt engaged between a drive sprocket and a transfer sprocket. The rotational axes of the transfer sprocket and the drive sprocket are oriented at an angle of up to 90 degrees from one another. The rotation of the transfer sprocket is conveyed to a propeller drive assembly mounted at the rear of a water craft by an elongated rotary shaft and a flexible transmission drive cable to facilitate removable of the propulsion system from the transportation conveyance.

4 Claims, 4 Drawing Sheets

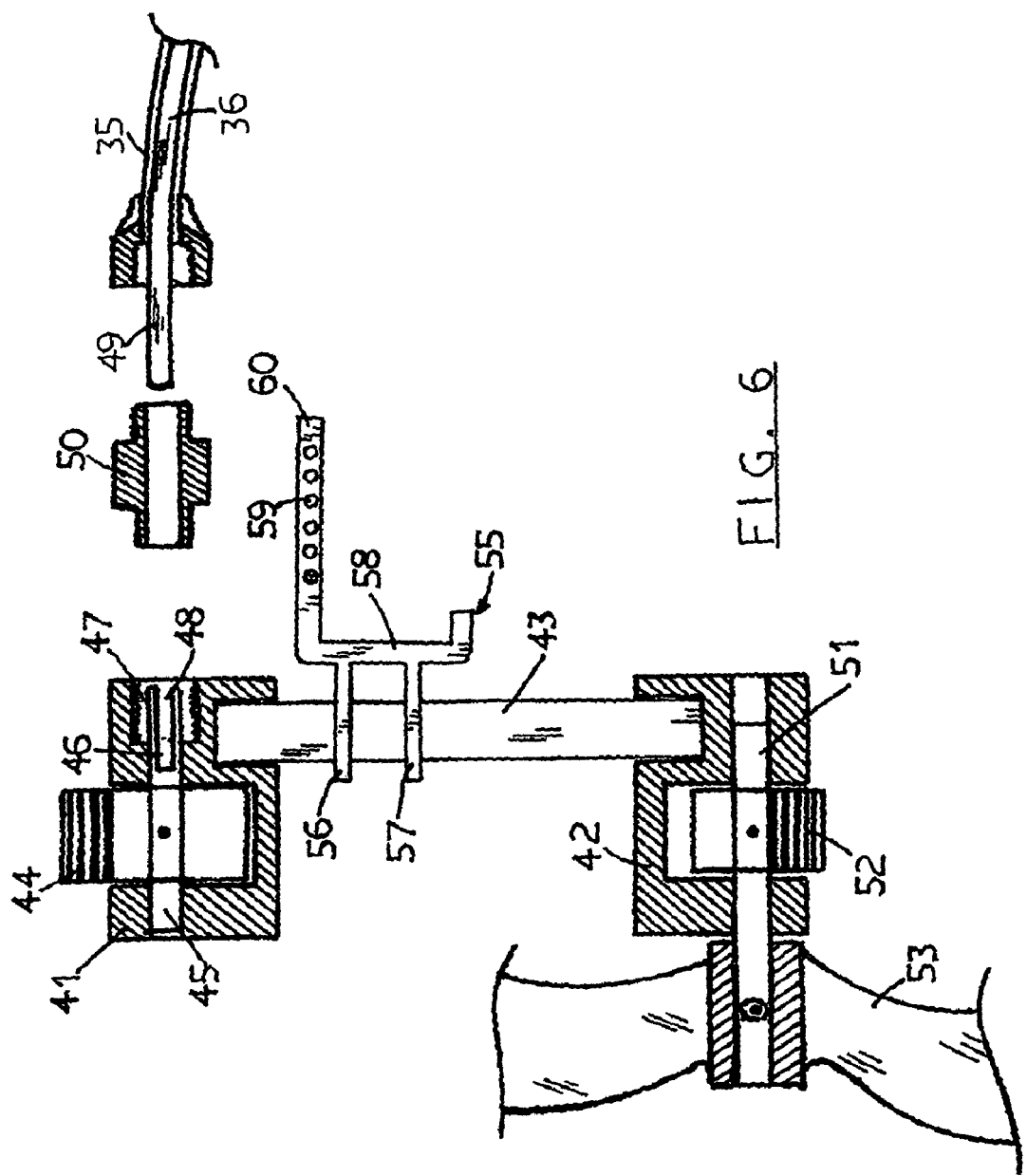

PEDAL PROPULSION SYSTEM

BACKGROUND OF THE INVENTION

1. Field of the Invention

This invention relates to a pedal propulsion system for powering a transportation conveyance particularly a relatively light weight water craft such as a canoe, boat and the like. The system has a portable support frame such that it is adaptable in the transportation conveyance. The support frame includes a seat for the operator to sit therein to operate the system with ease and comfort for driving the transportation conveyance.

2. Background of the Invention

Pedal propulsion systems are commonly employed for driving a boat. Most of the present propulsion systems are integrally built into the boat so that it is not removable from the latter. Thus it is particularly not convenient to transport the boat having a built-in pedal propulsion system.

In a pedal propulsion system, pedals mounted to a rotary shaft of a sprocket are operative to rotate the sprocket which is coupled by a continuous chain or a gear assembly for delivering the power to the driving device of a transportation conveyance. The sprocket has teeth formed on its peripheral circular edge to engage with links or loops in the chain or alternatively with a gear assembly which also engages with a toothed drive wheel to provide the rotational movement for the transportation conveyance. When a pedal propulsion system is used in a water craft for driving its propeller, the rotational movement of the toothed drive wheel must be converted for 90 degrees in order to rotate the propeller of the water craft. Alternatively, a gear assembly or similar mechanical linkage is employed to change the rotational movement of the sprocket for 90 degrees for the same purpose. The efficiency of a gear assembly or mechanical linkage is low due to friction and mechanical losses. Also, such propulsion systems effectively employ a pushing action for rotating the propeller drive of the water craft, which are inefficient and noisy in operation. The rotation speed of the propeller is also limited by the mechanical ratio between the sprocket and the rotational movement of the conversion wheels and the engagement between the chain and the sprocket or the gear assembly. Furthermore, such systems require high maintenance in sustaining their operation.

SUMMARY OF THE INVENTION

It is a principal object of the present invention to provide a pedal propulsion system which is conveniently adaptable in a transportation conveyance.

It is another object of the present invention to provide a pedal propulsion system which is efficient and low noise in operation.

It is another object of the present invention to provide a pedal propulsion system which is relatively simple in construction and yet provides efficient high speed operation of a water craft.

It is another object of the present invention to provide a pedal propulsion system which is simple to maintain and easy for the replacement of parts.

It is still an object of the present invention to provide a pedal propulsion system operative for steering a water craft without the need of a rudder.

It is yet another object of the present invention to provide a pedal propulsion system which is portable so that it can be conveniently and removably adapted within a water craft such that it may be conveniently removed from the water craft to facilitate transport of the water craft and the propulsion system separately from one another.

BRIEF DESCRIPTION OF THE DRAWINGS

Other objects and advantages of the present invention will become apparent from the following detailed description of the preferred embodiments thereof in connection with the accompanying drawings in which

FIG. 6 is an isolated enlarged perspective and partial cross sectional exploded view showing the linkage between the flexible cable and the propeller drive assembly of the system according to the present invention.

FIG. 7 is an isolated perspective elevation rear view showing the engagement of the propeller drive belt with the upper sprocket and the lower sprocket of the propeller drive assembly as shown in FIG. 6.

DETAILED DESCRIPTION OF THE PREFERRED EMBODIMENTS

Figure 1:
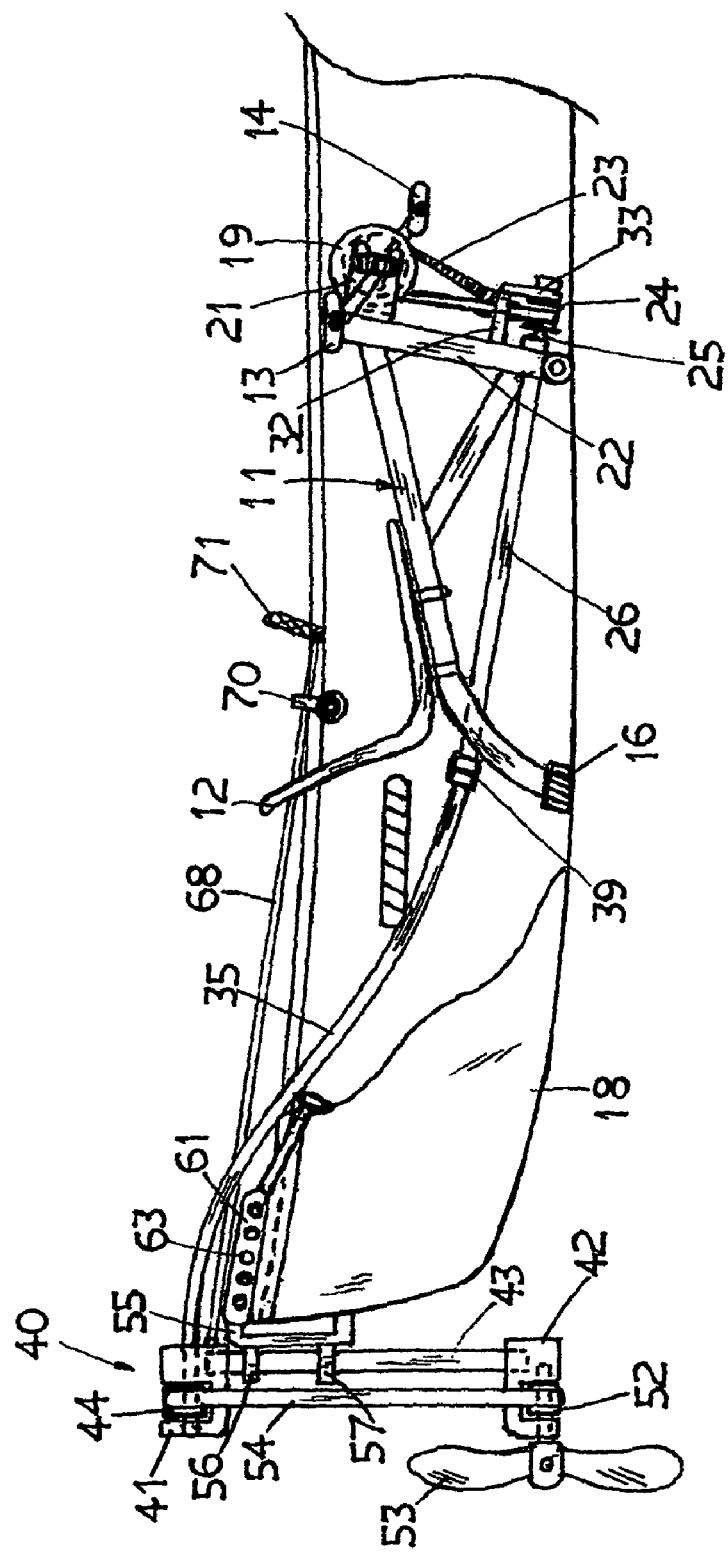
FIG. 1 is a perspective side elevation view of the pedal driven propulsion system according to the present invention located in the middle to rear portion of a canoe.
Figure 2:
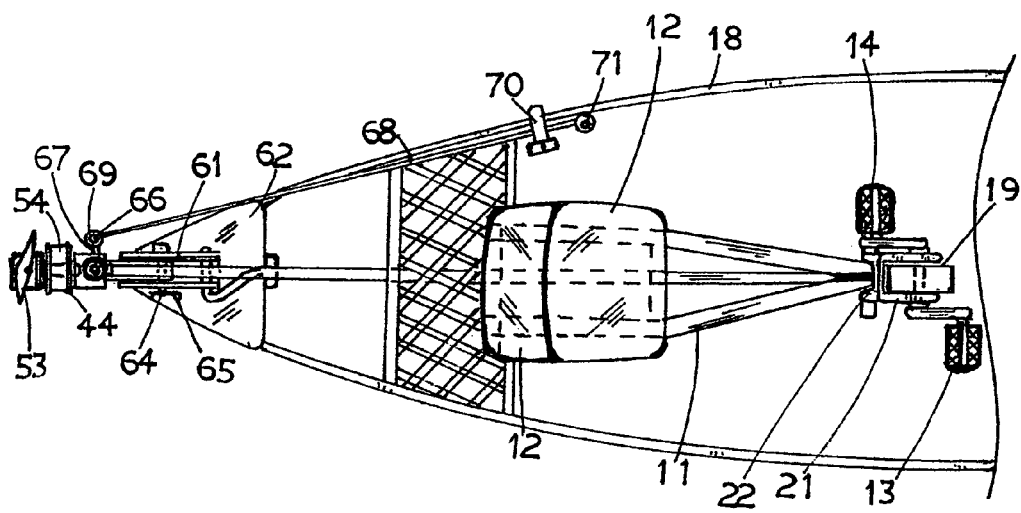
FIG. 2 is a perspective top elevation view of that of FIG. 1.
Figure 3:
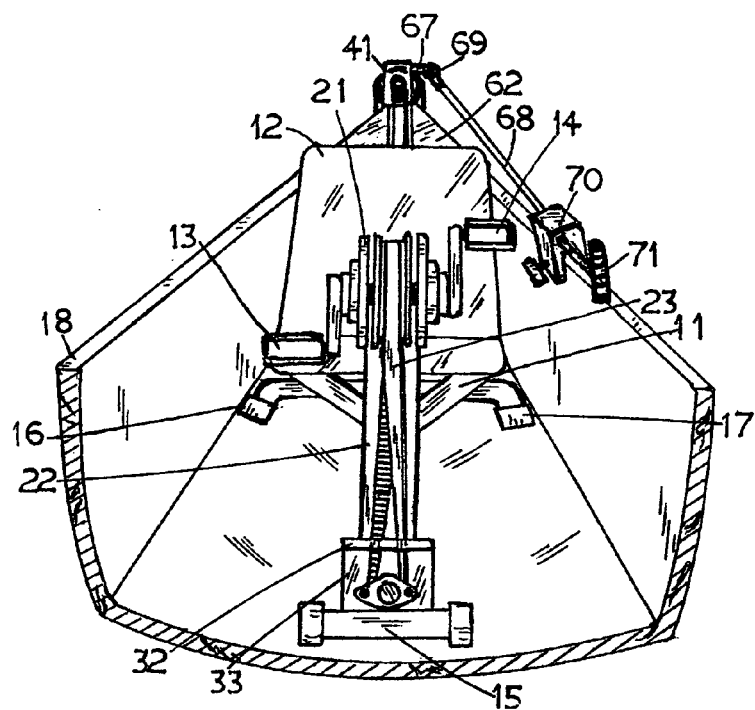
FIG. 3 is a perspective front elevation view of that of FIG. 1

With reference to the drawings in which like reference numerals designate corresponding parts in the different views, the pedal propulsion system 10 of the present invention has a supporting frame 11 with a seat 12 slidably mounted on the supporting frame 11 and the seat position is adjustable to accommodate an operator sitting therein to operate the propulsion pedals 13 and 14 comfortably. The supporting frame 11 is preferably of a portable construction which has supporting legs 15, 16 and 17 such that it may be conveniently and removably adapted within a water craft such as a canoe 18. A canoe 18 is shown as an exemplary embodiment of the application of the propulsion system of the present invention. It will be understood by those skilled in the art that the system may be applicable for powering other transportation conveyances such as a boat and the like. The pedal propulsion system has a pedal assembly which includes a drive sprocket 19 mounted on a crank shaft 20. The pedals 13 and 14 are mounted at the two ends of the crank shaft 20 which is rotatably mounted on an extension bifurcated arm 21 extending horizontally outward from a vertical post 22 of the supporting frame 11. The rotational axis of the drive sprocket 19 extends generally perpendicular to the longitudinal axis of the canoe 18. A drive belt 23 engages with the drive sprocket 19 and in a partially twisted manner also engages with a transfer sprocket 24 having its rotational axis oriented at an angle of up to 90 degrees with respect to the rotational axis of the drive sprocket 19. The drive sprocket 19 has a larger diameter than the diameter of the transfer sprocket 24 so as to enhance the ease in rotating the transfer sprocket 24 by the drive sprocket 19. The transfer sprocket 24 is mounted at a front end of an elongated rotary shaft 25. The elongated rotary shaft 25 is rotatably located within a protective outer tube 26 which extends through an access opening 27 formed at the lower portion of the vertical post 22 of the supporting frame 11. The outer tube 26 with the elongated rotary shaft 25 rotatably located therein extends rearwardly towards the rear of the canoe. Thus, operation of the pedals 13 and 14 to rotate the drive sprocket 19 will cause the transfer wheel 24 to rotate, and in turn, the elongated rotary shaft 25.

Both the drive sprocket 19 and the transfer sprocket 24 have transverse grooves 28 and 29 respectively, having the same configuration and pitch, formed on their circumferential drive surfaces. A sequential or synchronous drive belt with a toothed drive surface having transverse teeth 30 is looped and coupled between these sprockets so as to provide an efficient and low noise operation of the rotation of both of these sprockets. The transverse teeth 30 of the synchronous drive belt 23 have mating configuration and pitch as those of the transverse grooves 28 and 29 formed on the drive sprocket 19 and the transfer sprocket 24.

Figure 4:
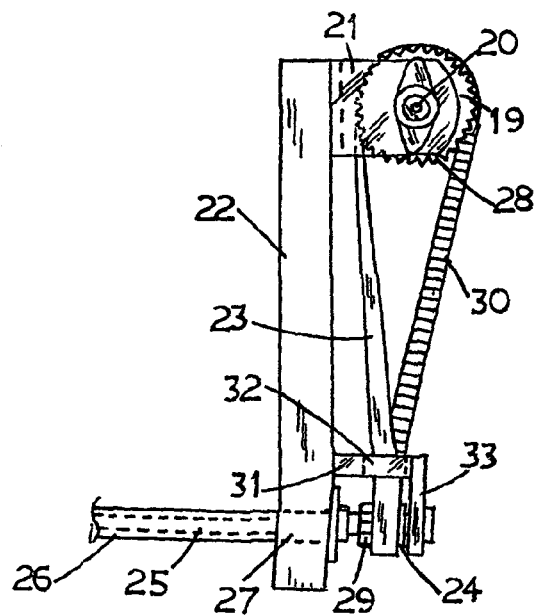
FIG. 4 is an isolated perspective side elevation view showing the transfer mechanism according to the present invention for converting the rotational movement of the drive wheel in one direction to an angled direction for rotating the rotary shaft for transmitting the rotational movement to the propeller drive assembly.
Figure 5:
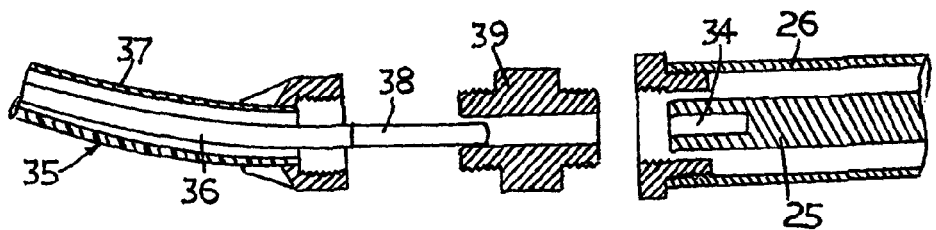
FIG. 5 is an isolated enlarged perspective cross sectional exploded side elevation view showing the coupling between the rotary shaft and the flexible transmission cable of the system according to the present invention.

A belt guide 31 is located at a short distance and spaced above the access opening 27 of the vertical post 22 and the transfer sprocket 24. The belt guide 31 extends generally in a horizontal cantilever manner from the vertical post 22 of the supporting frame 11, and it has a through opening 32 formed therein. The drive belt 23 passes through the through opening 32 such that the belt guide 31 serves to ensure the proper and snug engagement of the drive belt 23 with the drive sprocket 19 and the transfer sprocket 24. The transfer sprocket 24 is rotatably mounted on a vertical plate 33 having a top end portion attached to the outer edge of the belt guide 31. The belt guide 31 and the vertical plate 33 may be integrally formed by an inverted sideway L-shaped bracket provided on the vertical post 22 as best shown in FIG. 4.

The front end of the protective tube 26 may be fixedly mounted to the access opening 27. The elongated rotary shaft 25 is also preferably slidable slightly in a back and forth manner relative to the protective tube 26 so as to allow for a slight back and forth movement of the transfer sprocket 24 during operation. A multi-sided coupling hole 34 is formed at the rear end of the elongated rotary shaft 25. An elongated flexible rotary cable 35 having an elongated flexible steel cable 36 rotatably located within a flexible outer jacket 37 is connected to the rear end of the protective tube 26. The steel cable 36 has a multi-sided cross sectional shape and dimensioned end portion 38 equal to the multi-sided coupling hole 34 formed at the rear end of the elongated rotary shaft 25 such that the end of the steel cable 36 is insertable into the multi-sided coupling opening 34 of the rotary shaft 25 to engage with the latter. For simplicity of illustration, a square shaped coupling opening 34 is shown at the end of the elongated rotary shaft 25 and a cross sectional square shaped end portion is shown in the flexible rotary cable 35 in the exemplary embodiment. The rotary cable 35 and the protective outer tube 26 of the elongated rotary shaft 25 are mounted together with a tubular threaded coupling sleeve 39 removably mounted to threaded end portions formed in the inside surface of the rear end portion of the protective outer tube 26 and the end portion of the outer jacket 37 of the rotary cable 35 so as to facilitate easy connection and disconnection between the rotary cable 35 and the protective outer tube 26 of the elongated rotary shaft 25 for easy maintenance and replacement of parts. The rotation of the elongated rotary shaft 25 causes the steel cable 36 to rotate accordingly within the outer jacket 37 of the rotary cable 35.

The propeller drive assembly 40 has an upper drive unit 41 and a lower drive unit 42 mounted at the op end and lower end respectively of a vertical support rod 43. An upper sprocket 44 is rotatably mounted to a support shaft 45 which is rotatably mounted in the upper drive unit 41. The front end 46 of the support shaft 45 is exposed in a threaded opening 47 in the upper drive unit 41. A multi-sided or square coupling hole 48 is formed at the front end portion of the support shaft 45 such that the multi-sided or square rear end portion 49 of the flexible steel cable 36 may be inserted therein to couple the flexible steel cable 36 to the rotary shaft 45 of the upper drive unit 41. A threaded coupling sleeve 50 having threaded ends is provided for removably securing to the end of the outer jacket 35 of the flexible cable 36 and to the threaded opening 47 of the upper drive unit 41. A propeller rotary drive shaft 51 is rotatably mounted in the lower drive unit 42 of the propeller drive assembly 40. A lower sprocket 52 is mounted on the propeller drive shaft 51 and the propeller 53 is mounted on the rear end portion of the propeller drive shaft 51 extending rearwards from the lower drive unit 42. The upper sprocket 44 has a larger diameter than the lower sprocket 52 to provide efficient rotation of the lower sprocket 52 by the upper sprocket 44. A propeller drive belt 54 is coupled between the upper sprocket 44 and the lower sprocket 52 by looping between the upper sprocket 44 and lower sprocket 52. The upper sprocket 44 and the lower sprocket 52 preferably have transverse grooves of similar configuration and dimensions formed on their circumferential surfaces; and the propeller drive belt 54 preferably is a synchronous drive belt having transverse teeth formed on its drive surface with the transverse teeth having complementary mating configuration and dimensions of those of the transverse grooves formed on the circumferential surfaces of the upper sprocket 44 and the lower sprocket 52.

An inverted sideway L-shaped mounting rod 55 is rotatably mounted to the vertical support rod 43 with at least one and preferably two mounting rings 56 and 57 extending in a cantilever manner on a vertical arm portion 58 of the mounting rod 55 such that the propeller drive assembly 40 is rotatable relative to the mounting rod 55. A plurality of transverse through openings 59 spaced from one another are formed on a horizontal arm portion 60 of the mounting rod 55. The horizontal arm portion 60 of the mounting rod 55 is slidably insertable into a mounting bracket 61 secured on the deck 62 located at the rear end portion of the canoe 18 for removably mounting the propeller drive assembly 40 to the canoe 18. A plurality of spaced openings 63 are formed on the side walls of the mounting bracket 61 such that the horizontal position of the propeller drive assembly 40 relative to the canoe 18 may be selectively adjustable by inserting a securing pin 64 through a selected opening 63 aligned with a selected through opening 59 of the horizontal arm portion 60. The securing pin 64 may be securely retained in place with a cotter pin 65.

A pintle 66 is provided on a side arm 67 extending sideways from the upper drive unit 41. An elongated steering mechanical tie such as a rigid cable or rod 68 having an eyelet 69 formed at its rear end with the eyelet 69 slidably and hingedly engaged with the pintle 66. Thus, the propeller drive assembly 40 may be pivoted relative to the canoe 18 by pulling or pushing the rigid cable or rod 68 for steering the canoe when the pedal propulsion system is in operation. The rigid cable or rod 68 is mounted to the side of the canoe with a removable retaining clamp 70 to facilitate the removal of the pedal propulsion system from the canoe. A handle 71 is provided at the front end of the steering rigid cable or rod 68 for easy and convenient operation of the steering rigid cable or rod 68 in steering the canoe by the operator sitting on the pedal propulsion system of the present invention.

The synchronous belt drive system of the present invention provide an efficient and low noise system for driving a transportation conveyance in a fast speed with ease; and the canoe can be steered without employing a rudder. The system also may be provided in a portable manner in the water craft such that it may be conveniently removed from the latter for easy transport of the water craft and the propulsion system separate from one another.

While the preferred embodiments of the invention have been described above. It will be recognized and understood that various modifications may be made therein and the appended claims are intended to cover all such modifications which may fall within the scope of the present invention. For example, the propeller drive assembly may be mounted on the transom board of a relatively light weight boat with clamps for driving the boat.

What is claimed is:

1. A pedal propulsion system for a light weight water craft comprising,
   a portable support frame removably locatable on a bottom base inside said water craft,
   a seat adjustably mounted on said support frame for an operator to sit thereon for operating said propulsion system with ease,
   a low noise and efficient pedal assembly having pedals mounted at two ends of a rotatable crank shaft rotatably mounted on a vertical support post of said support frame; a drive sprocket mounted on said rotatable crank shaft of said pedal assembly and being rotatable by operating said pedals; a transfer sprocket mounted to a front end of an elongated rotary rod; and rotational axes of said drive sprocket and said transfer sprocket being oriented at a 90 degree angle relative to one another, and a synchronous drive belt looped and engaged with said drive sprocket and said transfer sprocket in a partially twisted manner,
   said rotary rod being rotatably located in a protective outer tube with a front end of said outer tube mounted to an access opening located at a lower portion of said vertical support post, said rotary rod being movable slidably in a back and forth manner relative to said protective outer tube, and said elongated rotary rod together with said outer protective tube having a rear end extending towards a rear end of said water craft,
   an elongated flexible transmission cable having an elongated flexible cable rotatably located within a flexible outer jacket and, a rear end of said protective outer tube of said rotary rod being removably connected to a front end of said protective jacket of said transmission cable, and said cable having a front end removably engageable with a rear end of said rotary rod,
   a propeller drive assembly removably mountable at a rear end of said water craft, said propeller drive assembly having an upper drive unit with an upper sprocket mounted on a support shaft rotatably mounted in said upper drive unit, said support shaft having a front end removably engageable with a rear end portion of said flexible cable,
   a lower sprocket rotatably mounted on a propeller drive shaft mounted in said lower drive unit,
   a propeller drive belt looped and engaged with said upper sprocket and said lower sprocket, and
   a propeller mounted at a rear end of said propeller drive shaft.

2. A pedal propulsion system according to claim 1 including a coupling opening formed at a rear end of said elongated rotary rod, a tubular coupling sleeve having one end removably mounted to a rear end of said protective outer tube of said elongated rotary rod and a second end removably mounted to a front end of a flexible outer jacket of said flexible rotary cable, and said flexible rotary cable having a flexible core cable rotatably located within said flexible outer jacket of said flexible rotary cable, said flexible core cable having a coupling front end engaged by inserting into said coupling opening at said rear end of said elongated rotary rod.

3. A pedal propulsion system according to claim 2 wherein said upper drive unit and said lower drive unit are mounted on a vertical support rod, and said vertical support rod being rotatably mounted to an inverted sideway L-shaped mounting rod with at least one mounting ring whereby said propeller drive assembly is rotatable relative to said mounting rod, said mounting rod having a horizontal arm portion provided with a plurality of spaced openings, and said horizontal arm portion being insertable into a mounting bracket secured on a rear deck of said water craft for removably mounting said propeller drive assembly to said water craft, said mounting bracket having a traverse through opening alignable with a selected opening of said plurality of openings of said horizontal arm portion for selecting a pivoted position of said propeller drive assembly relative to said water craft, and a securing pin being insertable through said through opening of said mounting bracket and said selected opening of said horizontal arm portion of said mounting rod for retaining said propeller drive assembly in a selected pivoted position relative to said water craft.

4. A pedal propulsion system according to claim 3 including an elongated mechanical tie having an eyelet provided at a rear end therein, said eyelet being mounted hingedly to a pintle located at a side arm of said upper drive unit of said propeller drive assembly, said mechanical tie being operative for pivoting said propeller drive assembly for steering said water craft, said mechanical tie being removably mounted to a side of said water craft to facilitate removal of said pedal propulsion system from said water craft, and a handle provided at a front end of said mechanical tie for and convenient operation in selectively pulling and pushing said mechanical tie by said operator sitting in said seat for steering said water craft.

* * * * *